United States Patent
Liebold et al.

(10) Patent No.: US 10,500,917 B2
(45) Date of Patent: Dec. 10, 2019

(54) METHOD AND CONTROL DEVICE FOR ADJUSTING THE DAMPING FORCE OF A SHOCK ABSORBER

(71) Applicant: Dr. Ing. h.c. F. Porsche Aktiengesellschaft, Stuttgart (DE)

(72) Inventors: Jochen Liebold, Stuttgart (DE); David Caredda, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 225 days.

(21) Appl. No.: 15/814,641

(22) Filed: Nov. 16, 2017

(65) Prior Publication Data

US 2018/0154730 A1    Jun. 7, 2018

(30) Foreign Application Priority Data

Dec. 5, 2016  (DE) .................. 10 2016 123 420

(51) Int. Cl.
*B60G 17/018* (2006.01)
*B60G 17/06* (2006.01)

(52) U.S. Cl.
CPC ...... B60G 17/06 (2013.01); *B60G 2400/0511* (2013.01); *B60G 2400/0512* (2013.01); *B60G 2400/252* (2013.01); *B60G 2400/60* (2013.01)

(58) Field of Classification Search
USPC ........................................ 701/37
See application file for complete search history.

(56) References Cited

U.S. PATENT DOCUMENTS

| | | | | |
|---|---|---|---|---|
| 4,916,632 A * | 4/1990 | Doi | ............... | B60G 17/018 280/5.515 |
| 5,100,166 A * | 3/1992 | Mitsui | ............... | B60G 17/018 188/267.1 |
| 5,944,763 A * | 8/1999 | Iwasaki | ............... | B60G 17/0162 701/37 |
| 2004/0212159 A1 * | 10/2004 | Stiller | ............... | B60G 17/08 280/5.515 |
| 2009/0164064 A1 * | 6/2009 | Yamanaka | ............... | B60G 17/018 701/37 |
| 2010/0106368 A1 * | 4/2010 | Hidaka | ............... | B60G 17/0165 701/38 |

FOREIGN PATENT DOCUMENTS

| | | |
|---|---|---|
| DE | 10318110 A1 | 11/2004 |
| DE | 102007051224 A1 | 4/2009 |

OTHER PUBLICATIONS

German Search Report for German Application No. 10 2016 123 420.6, with partial English translation, dated Aug. 9, 2017—7 Pages.

\* cited by examiner

*Primary Examiner* — Masud Ahmed

(74) *Attorney, Agent, or Firm* — RatnerPrestia

(57) ABSTRACT

A method for adjusting the damping force of shock absorbers, connected between a vehicle body and a wheel at vehicle corners of a motor vehicle, wherein at least one damping force which is referred to a center of gravity of the vehicle body and which is divided between the shock absorbers of the respective wheels of the motor vehicle is determined as a function of at least one variable which represents the movement of the vehicle body and/or a movement of the respective wheel. For at least one of the lifting, pitching and rolling modal directions, the respective damping force is determined as a function of a predefined, constantly maintained degree of damping of respective modal direction.

10 Claims, 2 Drawing Sheets

METHOD AND CONTROL DEVICE FOR ADJUSTING THE DAMPING FORCE OF A SHOCK ABSORBER

CROSS-REFERENCE TO RELATED APPLICATIONS

This application claims priority to German Patent Application No. 10 2016 123 420.6, filed Dec. 5, 2016, which is incorporated by reference herein in its entirety.

FIELD OF THE INVENTION

The invention relates to a method for adjusting the damping force of at least one shock absorber, connected between a vehicle body and a wheel of a motor vehicle. Furthermore, the invention relates to a control device for executing the method.

BACKGROUND OF THE INVENTION

Methods for adjusting the damping force of shock absorbers of a motor vehicle are sufficiently known from practice. For example, according to the Skyhook principle the adjustment of the damping force for a shock absorber, connected between a vehicle body and a wheel, of a motor vehicle takes place in such a way that a damping force for the respective shock absorber is determined as a function of a movement of the vehicle body and/or as a function of a movement of the respective wheel and is set, specifically within a defined actuation range.

In this context, according to practice, damping forces or damping torque at the center of gravity of the motor vehicle are calculated for the lifting, pitching and rolling modal directions of movement. Damping torques can be converted into damping forces. The damping forces which are calculated for the lifting, pitching and rolling modal directions of movement and are referred to the center of gravity of the motor vehicle are distributed between the axles of the motor vehicle and between the vehicle corners and therefore between the individual wheels and summed. The distribution of the damping forces which are referred to the center of gravity of the motor vehicle between the axles and the vehicle corners is carried out here on the basis of permanently predefined parameters.

In methods for adjusting the damping force which are known from practice, the damping forces for the lifting, pitching and rolling modal directions of movement are adapted as a function of speeds and/or accelerations. Until now, a changing mass of the motor vehicle and changing spring stiffnesses have not been taken into account. This gives rise to an inconsistent oscillation behavior of the motor vehicle.

U.S. Pat. No. 4,916,632 A, which is incorporated by reference herein, and U.S. Pat. No. 5,944,763 A, which is also incorporated by reference herein, have disclosed methods for adjusting the damping force of shock absorbers which are known from the prior art.

SUMMARY OF THE INVENTION

Described herein is a method for adjusting the damping force for shock absorbers of a motor vehicle, and a control device for executing the method, which method and control device can be used to improve the quality of damping.

According to aspects of the invention, for at least one of the lifting, pitching and rolling modal directions, the respective damping force is determined as a function of a predefined, constantly maintained degree of damping of the respective modal direction.

It is proposed for the first time to keep constant a degree of damping which is subject per se to a change during operation owing to a changing vehicle mass and/or a changing spring stiffness. As a result, a constant damping behavior or oscillation behavior of the motor vehicle can be ensured, and the quality of damping can be improved.

For all the lifting, pitching and rolling modal directions, the damping force is preferably determined as a function of a predefined, constantly maintained degree of damping of the corresponding modal direction. This is particularly preferred for making available a consistent oscillation behavior of the motor vehicle and for improving the quality of damping.

According to an advantageous development, for the lifting modal direction the degree of damping for the lifting modal direction is kept constant, in that a damping constant for the lifting modal direction is adapted as a function of a changing lifting-spring stiffness and/or changing mass of the motor vehicle, with the result that the degree of damping for the lifting modal direction remains constant, and/or for the pitching modal direction the degree of damping is kept constant in such a way that a damping constant for the pitching modal direction is adapted as a function of a changing pitching-spring stiffness and/or a changing pitching moment of mass inertia of the motor vehicle, with the result that the degree of damping for the pitching modal direction remains constant, and/or for the rolling modal direction the degree of damping is kept constant in such a way that a damping constant for the rolling modal directions is adapted as a function of a changing rolling-spring stiffness and/or a changing rolling-moment of mass inertia of the motor vehicle, with the result that the degree of damping for the rolling modal direction remains constant. This permits the degrees of damping for the lifting, pitching and rolling modal directions to be kept constant, specifically independently of changing spring stiffnesses and/or changing moments of mass inertia and/or a changing vehicle mass. This is particularly preferred in order to make available a consistent oscillation behavior of the motor vehicle and to improve the quality of damping.

The respective damping constant is calculated in a continuously updated fashion in order to keep the degree of damping constant.

BRIEF DESCRIPTION OF THE DRAWINGS

Preferred developments of the invention can be found in the following description. Exemplary embodiments of the invention are explained in more detail with reference to the drawing without being restricted thereto. In the drawing.

DETAILED DESCRIPTION OF THE INVENTION

Figure 1:
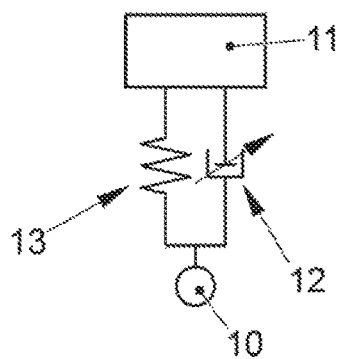
FIG. 1 shows a detail of a motor vehicle.

FIG. 1 shows, as a quarter vehicle model of a motor vehicle, a highly schematic detail of a motor vehicle in the region of a wheel 10 of the motor vehicle and of a vehicle body 11 thereof, wherein according to FIG. 1 both the shock absorber 12 and a spring element 13 are connected between the vehicle body 11 and the wheel 10.

According to FIG. 1, the damping force of the shock absorber 12 which is connected between the wheel 10 and the vehicle body 11 can be adjusted.

In order to adjust the damping force, which is made available by the shock absorber 12, a damping force is determined, in particular by a control device of the motor vehicle, specifically as a function of at least one variable which represents a movement of the vehicle body 11 and/or as a function of at least one variable which represents a movement of the respective wheel 10.

Then, if the damping force is adjusted according to the so-called Skyhook principle, a corresponding controller of the control device determines a damping force as a function of at least one variable which represents the movement of the vehicle body 11 and/or as a function of at least one variable which represents a movement of the respective wheel, specifically for a plurality of modal directions of movement of the vehicle body 11, specifically for modal lifting of the vehicle body 11, modal pitching of the vehicle body 11 and modal rolling of the vehicle body 11. This damping force is firstly referred to the center of gravity of the vehicle body 11 or of the motor vehicle and has to be divided between the axles and edges.

Using a controller to carry out the basic determination, in particular according to the Skyhook method, of a setpoint damping force which is referred to the center of gravity of the vehicle body 11 or motor vehicle is basically known to the person skilled in the art in question here.

At this point, for the sake of completeness reference will be made to the fact that in Skyhook methods which are known from the prior art for the lifting, pitching and rolling modal directions of movement, corresponding damping forces $F_{LIFT}$, $F_{PITCH}$ and $F_{ROLL}$ as well as translator modal speeds $v_{LIFT}$, $v_{PITCH}$ and $v_{ROLL}$ are calculated taking into account the following equations:

$$F_{LIFT} = 2D_{LIFT}\sqrt{c_{LIFT}m}z, v_{LIFT} = \dot{z},$$

$$M_{PITCH} = 2D_{PITCH}\sqrt{c_{PITCH}J_{PITCH}}\varphi, F_{PITCH} = f(M_{PITCH}), v_{PITCH} = f(\dot{\varphi}),$$

$$M_{ROLL} = 2D_{ROLL}\sqrt{c_{ROLL}J_{ROLL}}\Theta, F_{ROLL} = f(M_{ROLL}), v_{ROLL} = f(\dot{\Theta}).$$

According to the prior art, these damping forces $F_{LIFT}$, $F_{PITCH}$ and $F_{ROLL}$ at the center of gravity of the motor vehicle are calculated and divided between the individual vehicle corners of the motor vehicle and therefore the individual wheels of the motor vehicle, and for each vehicle corner are summed to form a total damping force for the respective vehicle corner.

For the above calculation of the damping forces $F_{LIFT}$, $F_{PITCH}$ and $F_{ROLL}$ for the lifting, pitching and rolling modal directions, the respective degrees of damping $D_{LIFT}$, $D_{PITCH}$ and $D_{ROLL}$ are taken into account for the modal directions, for which degrees of damping $D_{LIFT}$, $D_{PITCH}$, and $D_{ROLL}$ the following relationships apply:

$$D_{LIFT} = \frac{d_{LIFT}}{2\sqrt{c_{LIFT}m}},$$

$$D_{PITCH} = \frac{d_{PITCH}}{2\sqrt{c_{PITCH}J_{PITCH}}},$$

-continued $$D_{ROLL} = \frac{d_{ROLL}}{2\sqrt{c_{ROLL}J_{ROLL}}}.$$

In this context, according to the prior art constant damping constants $d_{LIFT}$, $d_{PITCH}$ and $d_{ROLL}$ are predefined on the control side.

Changing spring stiffnesses $c_{LIFT}$, $c_{PITCH}$, $c_{ROLL}$, a changing mass m and changing moments of mass inertia $J_{PITCH}$ and $J_{ROLL}$ have up to now not been taken into account according to the prior art.

Figure 2:
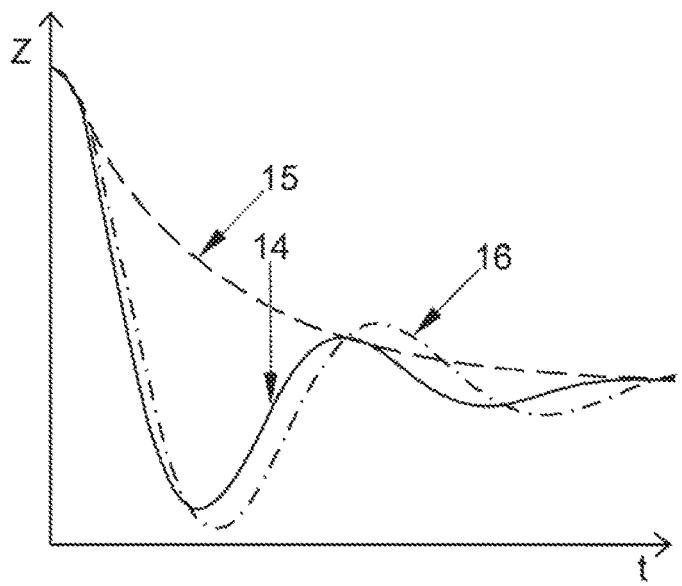
FIG. 2 shows a first time diagram clarifying the prior art.
Figure 3:
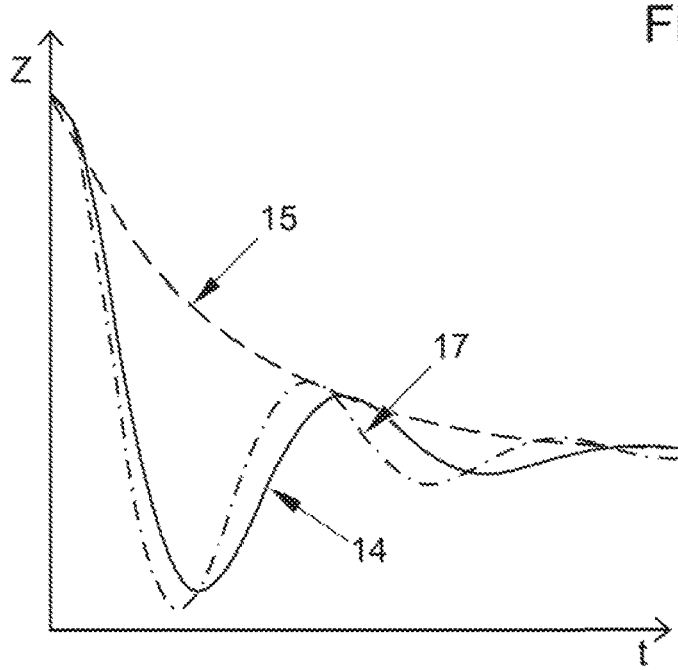
FIG. 3 shows a second time diagram clarifying the prior art.

The effects of this procedure known from the prior art on the oscillation behavior of a motor vehicle in the case of a changing mass and in the case of a changing spring stiffness for the lifting modal direction are shown in FIGS. 2 and 3, wherein in FIGS. 2 and 3 the oscillation path z is plotted over the time t for the lifting modal direction. An oscillation profile 14 respectively clarifies in FIGS. 2 and 3 the oscillation behavior for the lifting modal direction which is formed when the actual spring stiffness for the lifting modal direction and the actual mass of the motor vehicle correspond to the corresponding variables which are predefined on the control side, with the result that a decay behavior which is displayed by the curve profiles 15 is then formed.

However, if the mass of the motor vehicle is increased, for example owing to an increase in its cargo, the curve profile 16 in FIG. 2 shows how an increased mass causes the oscillation profile or the oscillation behavior to change, assuming a constant spring stiffness and constant damping constant. In FIG. 2, it is apparent from the second harmonic that the damping in the form of the chronological decay behavior and the decay behavior per oscillation cycle becomes smaller.

The curve profile 17 in FIG. 3 illustrates a change in the oscillation profile for the case in which the spring stiffness for the lifting modal direction is increased, specifically assuming a constant mass of the motor vehicle and a constant damping constant. The spring stiffness can change, for example, owing to suspension kinematics. Therefore, for example in the case of air springs the spring stiffness can be changed by connecting and disconnecting air volumes.

The curve profile 17 in FIG. 3 shows how a change in spring stiffness acts on the oscillation profile. Although a spring stiffness which is increased in FIG. 3 does not have any influence on the decay over time, it does on the relative decay per oscillation cycle. Accordingly, it follows from FIGS. 2 and 3 that the oscillation behavior of a motor vehicle for the lifting modal direction is dependent on a changing vehicle mass and a changing spring stiffness for the lifting modal direction. A changing mass and a changing spring stiffness also bring about a change in the damping requirement.

In the sense of the present invention here, for at least one of the lifting, pitching and rolling modal directions, preferably for all the lifting, pitching and rolling modal directions, the respective damping force $F_{LIFT}$, $F_{PITCH}$, $F_{ROLL}$ are determined as a function of a predefined and constantly maintained degree of damping $D_{LIFT}$, $D_{PITCH}$, $D_{ROLL}$. In this context, in the case of a changing vehicle mass and/or in the case of a changing mass inertia and/or in the case of a changing spring stiffness for the respective modal direction, the respective damping constant is adapted with the result that the degree of damping for the respective modal direction remains constant.

The damping constant for the lifting modal direction is preferably adapted in such a way that the degree of damping for the lifting modal direction remains constant, specifically $$D_{LIFT} = \frac{d_{LIFT}}{2\sqrt{c_{LIFT}m}},$$

where
$D_{LIFT}$ is the degree of damping for the lifting modal direction,
$d_{LIFT}$ is the damping constant for the lifting modal direction,
$c_{LIFT}$ is the lifting-spring stiffness, and
m is the mass.

The damping constant for the pitching modal direction is preferably adapted in such a way that the degree of damping remains constant, specifically $$D_{PITCH} = \frac{d_{PITCH}}{2\sqrt{c_{PITCH}J_{PITCH}}},$$

where
$D_{PITCH}$ is the degree of damping for the pitching modal direction,
$d_{PITCH}$ is the damping constant for the pitching modal direction,
$c_{PITCH}$ is the pitching-spring stiffness, and
$J_{PITCH}$ is the pitching moment of mass inertia.

The damping constant for the rolling modal direction is preferably adapted in such a way that the degree of damping for the rolling modal direction remains constant, specifically $$D_{ROLL} = \frac{d_{ROLL}}{2\sqrt{c_{ROLL}J_{ROLL}}},$$

wherein
$D_{ROLL}$ is the degree of damping for the rolling modal direction,
$d_{ROLL}$ is the damping constant for the rolling modal direction,
$c_{ROLL}$ is the rolling-spring stiffness, and
$J_{ROLL}$ is the rolling moment of mass inertia.

The invention relates to the underlying concept of adapting the damping constant d for the respective modal direction, specifically as a function of a changing vehicle mass and/or of changing moments of mass inertia and/or of changing spring stiffnesses, in order thereby to keep the degree of damping constant. In this way, a consistent oscillation behavior of the motor vehicle can be made available.

A changing spring stiffness can be determined, for example, as a function of a characteristic curve. A changing mass can be either sensed by measuring the equipment using a load sensor or alternatively calculated. The moment of mass inertia can be correspondingly scaled as a function of a changing vehicle mass, using the so-called Steiner's theorum, with which the person skilled in the art in question is familiar.

Figure 4:
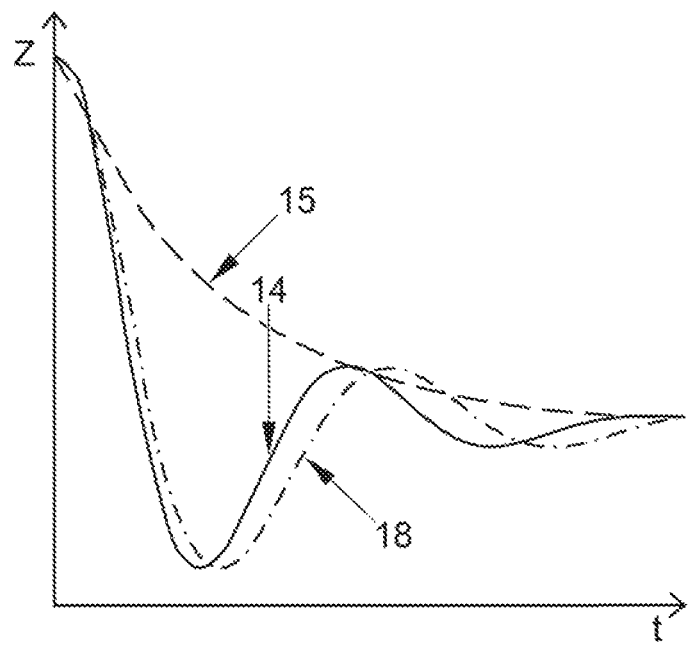
FIG. 4 shows a first time diagram clarifying the invention.
Figure 5:
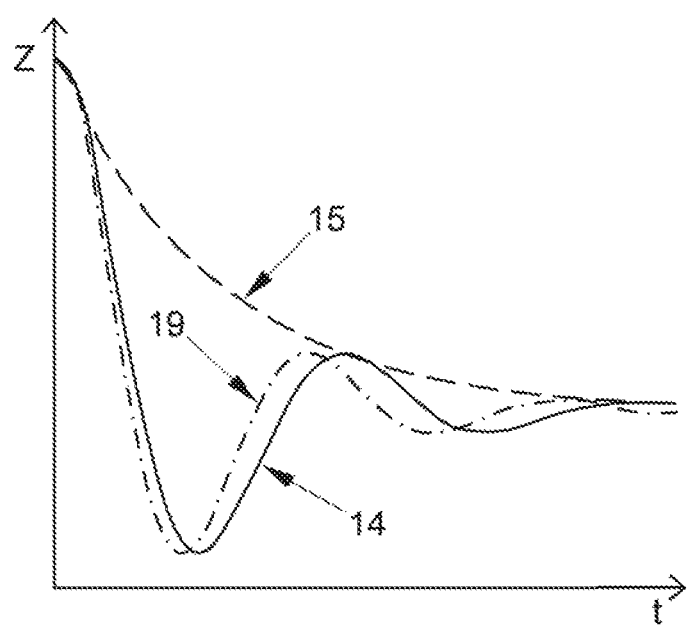
FIG. 5 shows a second time diagram clarifying the invention.

FIGS. 4 and 5 provide evidence of the effectiveness of the method according to aspects of the invention for the lifting modal direction, wherein in turn a plurality of time curve profiles are shown in FIGS. 4 and 5 plotted against the time t, wherein the curve profiles 14 and 15 in FIGS. 4 and 5 correspond to the curve profiles 14 and 15 in FIGS. 2 and 3, that is to say show an oscillation profile 14 and a decay behavior 15 for the case in which an actual mass and an actual spring stiffness for the lifting modal direction correspond to variables which are predefined on the control side.

In FIG. 4, the time curve profile 18 illustrates an oscillation profile which is formed when, in accordance with FIG. 2, the vehicle mass is increased, for example owing to an increase in cargo, but according to aspects of the invention the damping constant $d_{LIFT}$ is not kept constant but instead is adapted in such a way that despite the changing vehicle mass the degree of damping $D_{LIFT}$ remains constant.

As a result of this measure, the decay which is referred to the oscillation cycle can be kept unchanged compared to the variant of the curve profile 14. The natural frequency which has become smaller with the mass becomes slightly smaller as result of the increased damping constant.

FIG. 5 shows the effectiveness of the method in the case of a changing spring stiffness for the lifting modal direction, wherein the curve profile 19 shows an oscillation profile for the case in which, by analogy with FIG. 3, the spring stiffness of the lifting modal direction becomes larger, but at the same time the damping constant $d_{LIFT}$ is adapted in order to keep the degree of damping $D_{LIFT}$ constant.

From FIG. 5 it is apparent that in the case of an oscillation profile 19 which is formed by using the invention the decay which is referred to the oscillation cycle remains unchanged compared to the profile 14. The natural frequency which has become larger as a result of the relatively high spring stiffness is compensated slightly by increasing the spring stiffness.

With the invention it is possible to ensure a consistent oscillation behavior for changing vehicle masses and/or changing moments of mass inertia and/or changing spring stiffnesses. As a result, a damping controller only has to be applied for one variant, and every other variant has the applied method. This permits the application expenditure to be reduced significantly. The oscillation behavior of the motor vehicle can be adjusted in an optimum way without excessive damping or insufficient damping occurring.

The invention also relates to a control device for executing the method according to aspects of the invention. The control device carries out the method on the control side and for this purpose has means, specifically both hardware means and software means.

The hardware means include data interfaces in order to exchange data with the assemblies which are involved in the execution of the method according to aspects of the invention. The hardware means also include a data memory for storing data and a processor for processing data. The software means include program modules for executing the method.

What is claimed is:
1. A method for adjusting a damping force of shock absorbers connected between a vehicle body and a wheel at vehicle corners of a motor vehicle, the method comprising the steps of:
    determining at least one damping force ($F_{LIFT}$, $F_{PITCH}$, $F_{ROLL}$), which is referred to a center of gravity of a vehicle body, and which is divided between shock absorbers of the respective wheels of the motor vehicle as a function of at least one variable which represents a movement of the vehicle body or a movement of the respective wheel,
    determining, for at least one of the lifting, pitching and rolling modal directions, the respective damping force

($F_{LIFT}$, $F_{PITCH}$, $F_{ROLL}$) as a function of a predefined, constantly maintained degree of damping of the respective modal direction, wherein, for the lifting modal direction, the degree of damping for the lifting modal direction is kept constant, in that a damping constant for the lifting modal direction is adapted as a function of a changing lifting-spring stiffness or changing mass of the motor vehicle, with the result that the degree of damping for the lifting modal direction remains constant, and wherein the damping constant $d_{LIFT}$ for the lifting modal direction is adapted in such a way that the degree of damping $D_{LIFT}$ remains constant according to the equation:

$$D_{LIFT} = \frac{d_{LIFT}}{2\sqrt{c_{LIFT}m}},$$

where $D_{LIFT}$ is the degree of damping for the lifting modal direction, $d_{LIFT}$ is the damping constant for the lifting modal direction, $c_{LIFT}$ is the lifting-spring stiffness, and m is the mass.

2. The method as claimed in claim 1, wherein, for all the lifting, pitching and rolling modal directions, the respective damping force ($F_{LIFT}$, $F_{PITCH}$, $F_{ROLL}$) is determined as a function of a predefined, constantly maintained degree of damping of the corresponding modal direction.

3. The method as claimed in claim 1, wherein the damping constant for the lifting modal direction is calculated in a continuously updated fashion.

4. The method as claimed in claim 1, wherein for the pitching modal direction, the degree of damping is kept constant in such a way that a damping constant for the pitching modal direction is adapted as a function of a changing pitching-spring stiffness or a changing pitching moment of mass inertia of the motor vehicle, with the result that the degree of damping for the pitching modal direction remains constant.

5. The method as claimed in claim 1, wherein, for the rolling modal direction, the degree of damping is kept constant in such a way that a damping constant for the rolling modal direction is adapted as a function of a changing rolling-spring stiffness or a changing rolling-moment of mass inertia of the motor vehicle, with the result that the degree of damping for the rolling modal direction remains constant.

6. A method for adjusting a damping force of shock absorbers connected between a vehicle body and a wheel at vehicle corners of a motor vehicle, the method comprising the steps of:

determining at least one damping force ($F_{LIFT}$, $F_{PITCH}$, $F_{ROLL}$), which is referred to a center of gravity of a vehicle body, and which is divided between shock absorbers of the respective wheels of the motor vehicle as a function of at least one variable which represents a movement of the vehicle body or a movement of the respective wheel, determining, for at least one of the lifting, pitching and rolling modal directions, the respective damping force ($F_{LIFT}$, $F_{PITCH}$, $F_{ROLL}$) as a function of a predefined, constantly maintained degree of damping of the respective modal direction, wherein for the pitching modal direction, the degree of damping is kept constant in such a way that a damping constant for the pitching modal direction is adapted as a function of a changing pitching-spring stiffness or a changing pitching moment of mass inertia of the motor vehicle, with the result that the degree of damping for the pitching modal direction remains constant, and wherein the damping constant $d_{PITCH}$ for the pitching modal direction is adapted in such a way that the degree of damping $D_{PITCH}$ remains constant and according to the equation:

$$D_{PITCH} = \frac{d_{PITCH}}{2\sqrt{c_{PITCH}J_{PITCH}}},$$

where $D_{PITCH}$ is the degree of damping for the pitching modal direction, $d_{PITCH}$ is the damping constant for the pitching modal direction, $c_{PITCH}$ is the pitching-spring stiffness, and $J_{PITCH}$ is the pitching moment of mass inertia.

7. The method as claimed in claim 6, wherein the damping constant for the pitching modal direction is calculated in a continuously updated fashion.

8. A method for adjusting a damping force of shock absorbers connected between a vehicle body and a wheel at vehicle corners of a motor vehicle, the method comprising the steps of:

determining at least one damping force ($F_{LIFT}$, $F_{PITCH}$, $F_{ROLL}$), which is referred to a center of gravity of a vehicle body, and which is divided between shock absorbers of the respective wheels of the motor vehicle as a function of at least one variable which represents a movement of the vehicle body or a movement of the respective wheel, determining, for at least one of the lifting, pitching and rolling modal directions, the respective damping force ($F_{LIFT}$, $F_{PITCH}$, $F_{ROLL}$) as a function of a predefined, constantly maintained degree of damping of the respective modal direction, wherein, for the rolling modal direction, the degree of damping is kept constant in such a way that a damping constant for the rolling modal direction is adapted as a function of a changing rolling-spring stiffness or a changing rolling-moment of mass inertia of the motor vehicle, with the result that the degree of damping for the rolling modal direction remains constant, and wherein the damping constant $d_{ROLL}$ for the rolling modal direction is adapted in such a way that the degree of damping $D_{ROLL}$ remains constant and according to the equation:

$$D_{ROLL} = \frac{d_{ROLL}}{2\sqrt{c_{ROLL}J_{ROLL}}},$$

wherein $D_{ROLL}$ is the degree of damping for the rolling modal direction, $d_{ROLL}$ is the damping constant for the rolling modal direction, $c_{ROLL}$ is the rolling-spring stiffness, and $J_{ROLL}$ is the rolling moment of mass inertia.

9. The method as claimed in claim 8, wherein the damping constant for the rolling modal direction is calculated in a continuously updated fashion.

10. A control device for adjusting a damping force of shock absorbers which are connected between a vehicle body and a respective wheel at vehicle corners of the motor vehicle, wherein said control device is configured to:

- determine at least one damping force ($F_{LIFT}$, $F_{PITCH}$, $F_{ROLL}$), which is referred to a center of gravity of the vehicle body, and which is divided between the shock absorbers of the respective wheels of the motor vehicle as a function of at least one variable which represents a movement of the vehicle body or a movement of the respective wheel, and
- determine, for at least one of the lifting, pitching and rolling modal directions, the respective damping force ($F_{LIFT}$, $F_{PITCH}$, $F_{ROLL}$) as a function of a predefined, constantly maintained degree of damping of the respective modal direction,
- wherein, for the lifting modal direction, the degree of damping for the lifting modal direction is kept constant, in that a damping constant for the lifting modal direction is adapted as a function of a changing lifting-spring stiffness or changing mass of the motor vehicle, with the result that the degree of damping for the lifting modal direction remains constant, and
- wherein the damping constant $d_{LIFT}$ for the lifting modal direction is adapted in such a way that the degree of damping $D_{LIFT}$ remains constant according to the equation:

$$D_{LIFT} = \frac{d_{LIFT}}{2\sqrt{c_{LIFT}m}},$$

where
$D_{LIFT}$ is the degree of damping for the lifting modal direction,
$d_{LIFT}$ is the damping constant for the lifting modal direction,
$c_{LIFT}$ is the lifting-spring stiffness, and
m is the mass.

* * * * *